Figure 1:
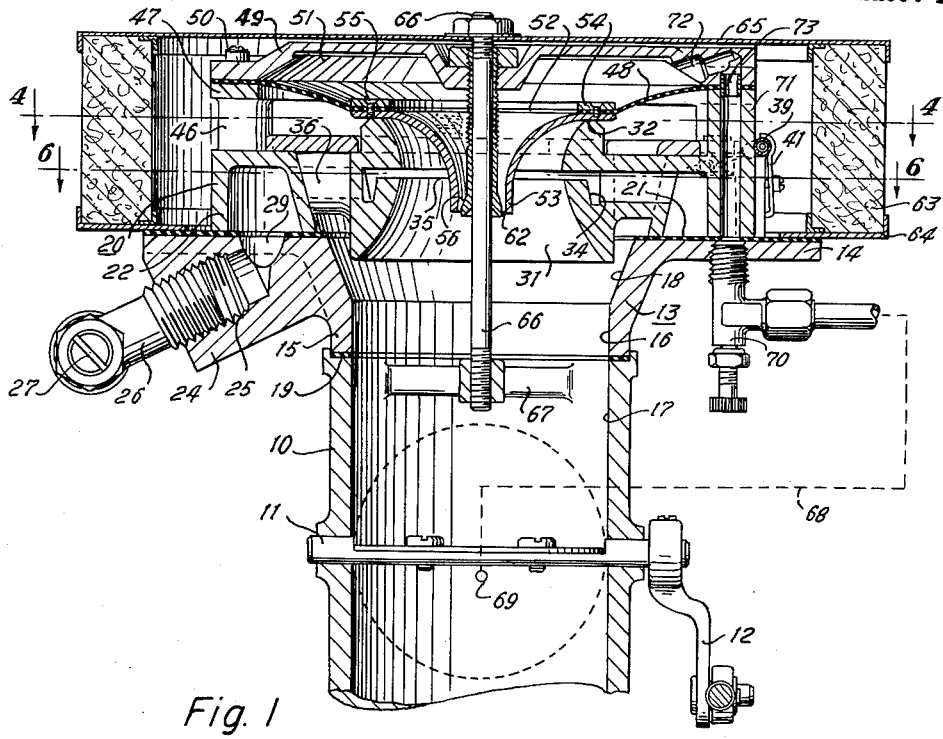

May 9, 1961  S. P. JONES  2,983,592
FUEL GAS MIXERS FOR INTERNAL COMBUSTION ENGINES
Filed Dec. 3, 1959  3 Sheets-Sheet 1

INVENTOR
Sam P. Jones

BY Ashley & Ashley

ATTORNEYS

May 9, 1961  S. P. JONES  2,983,592
FUEL GAS MIXERS FOR INTERNAL COMBUSTION ENGINES
Filed Dec. 3, 1959  3 Sheets-Sheet 2

INVENTOR
Sam P. Jones
BY *Ashley & Ashley*
ATTORNEYS

INVENTOR
Sam P. Jones

BY *Ashley & Ashley*

ATTORNEYS

United States Patent Office 2,983,592
Patented May 9, 1961

2,983,592

FUEL GAS MIXERS FOR INTERNAL COMBUSTION ENGINES

Sam P. Jones, Dallas, Tex., assignor to J & S Carburetor Company, Dallas, Tex., a corporation of Texas Filed Dec. 3, 1959, Ser. No. 856,969

14 Claims. (Cl. 48—184)

This invention relates to new and useful improvements in fuel gas mixers for internal combustion engines.

The invention is concerned with mixing valves or devices for supplying a combustible or explosive mixture of fuel gas and air for the fuel supply of internal combustion engines, being more particularly directed to such devices specifically arranged for utilization with liquefied petroleum gas, known in the industry as LPG, and consisting essentially of propane, butane, and mixtures thereof.

In the past, there have been available fuel gas mixers of the variable orifice type in which the air and gas valves are linked together in some suitable fashion and operated in unison. There have also been available variable differential fuel gas mixers employing fixed fuel and air orifices and wherein the varying of a pressure differential, normally in the flowing air path, is employed for the purpose of obtaining the desired fuel mixtures at various operating loads to which the engine may be subjected, taking into account that a fixed fuel orifice is normally involved. Both types of gas mixers will operate quite satisfactorily under a particular load condition and with particular air and fuel mixture settings, but both have disadvantages when the entire load range of an engine is considered. Thus, in the case of a variable orifice fuel gas mixer, a setting adequate to give a fuel mixture rich enough for starting would normally provide a mixture too rich for idling whereas a variable differential type gas mixer properly proportioned and adjusted for effective engine loading would be virtually inoperative for starting and idling conditions. Such mixers utilize a Venturi which heretofore has necessarily involved a compromise in fuel mixer design. To provide a Venturi small enough to give good idling and idling progression as well as starting operation for the engine, one would necessarily sacrifice power in the upper speed and load ranges of the engine. A Venturi properly designed and of sufficient capacity to permit production of the full power capabilities of the engine, with maximum pressure recovery across the Venturi characteristic of such design, and of sufficient diameter to provide maximum desired air flow, would necessarily be several times too large for effective starting and idling, as well as idle progression operation of the engine. In the present invention, on the other hand, a combination structure is utilized wherein good starting, idling, and idle progression performance results with the device gradually shifting to straight Venturi operation and full power performance by the engine in the upper speed and load ranges although the Venturi may be several sizes larger than would normally be possible to use on the particular engine at hand.

In addition, it must be kept in mind that engines operating on LPG fuel present different starting problems from engines operating on gasoline or other liquid fuels in that the explosive range air and LPG mixtures is much narrower and more critical than the explosive range of gasoline and air mixtures, and accordingly, a more critical control of the fuel-air ratio must be obtained for the most effective starting procedures.

With these and other existing and related problems in view, it is a principal object of this invention to provide an improved fuel gas mixer for internal combustion engines which utilizes the more desirable characteristics of variable differential and variable orifice type gas mixers with each type of mixture control becoming effective and/or predominant in regulating the fuel-air mixture in accordance with the load conditions under which the engine is operating.

A further important object of the invention is to provide an improved fuel gas mixer for internal combustion engines providing automatic and independent control of the fuel-air mixture for operation of the internal combustion engine under starting, idling, idle progression, and loading conditions, such control being made effective regardless of the slowness or rapidity with which the engine shifts from one loading condition to another.

Still another important object of the invention is to provide an improved fuel gas mixer for internal combustion engines having provision for supplying with certainty a starting fuel and air mixture of the proper richness for ensuring a proper and successful starting operation, and which is particularly adapted for use with LPG fuel which has the characteristic of exhibiting a rather critical range of explosive mixtures with air for purpose of starting an internal combustion engine.

Yet another object of the invention is to provide an improved fuel gas mixer for internal combustion engines having provision for automatically maintaining in the engine intake manifold a fuel-air mixture of the proper richness for starting conditions whereby the engine will remain over-night or even for several days with its intake manifold charged with a starting mixture of proper richness whereby virtually instant starting of the engine is readily obtained.

A still further object of the invention is to provide an improved fuel gas mixer for internal combustion engines normally supplying a fuel-air mixture of marked effectiveness under starting conditions, and in which means is provided for increasing the admission of air to lean the starting mixture or reduce the richness thereof, followed by reduction of air supply to gradually increase the richness of the mixture so that the operator is ensured that the fuel mixture will pass one or more times through the critical explosive range characteristic of LPG and air mixtures when utilized as engine fuels.

Still another object of the invention is to provide an improved fuel gas mixer for internal combustion engines utilizing a weighted diaphragm and means for establishing a pressure differential across the diaphragm varying in accordance with the engine loading and operating conditions for placing the diaphragm wholly or partially in restricting relationship with a Venturi for regulating or restricting the rate of air and fuel flow to the engine as well as for withdrawing the diaphragm from operation to permit straight Venturi control of the flow of air and fuel to the engine.

A construction designed to carry out the invention will be hereinafter described, together with other features of the invention.

Figure 2:
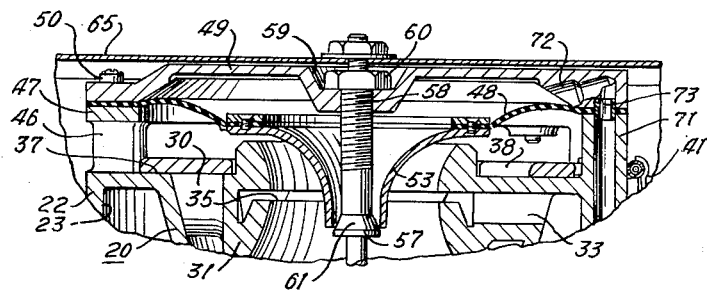
Figure 3:
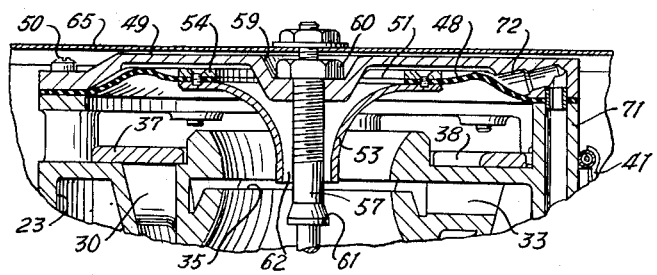
Figure 4:
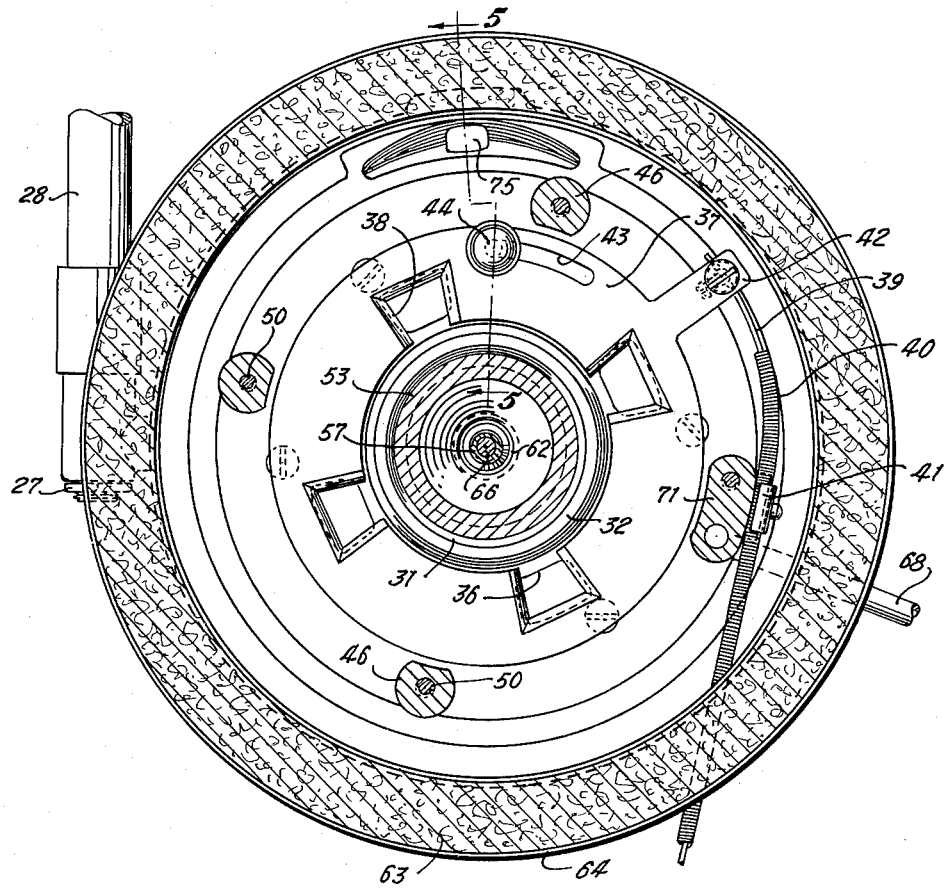
Figure 5:
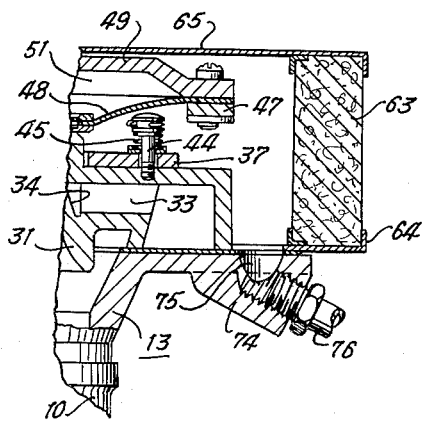
Figure 6:
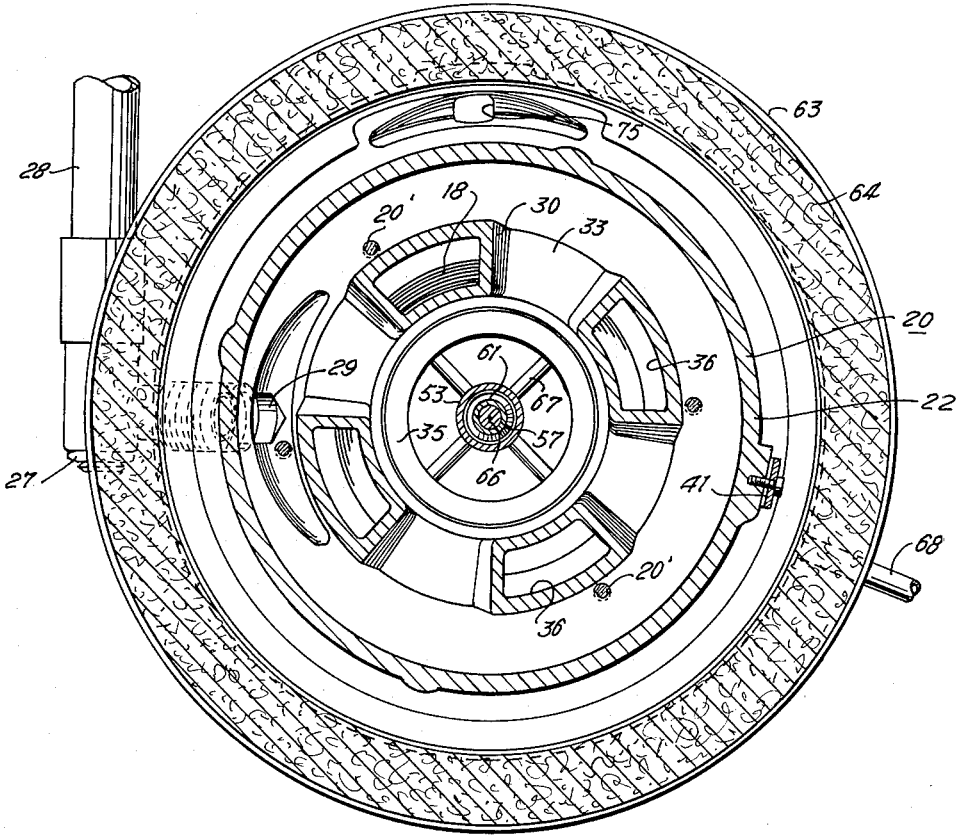
Figure 7:
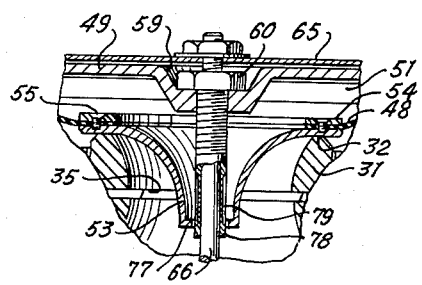

The invention will be more readily understood from a reading of the following specification and by reference to the accompanying drawings, wherein examples of the invention are shown, and wherein:

Fig. 1 is a vertical, sectional view of a gas mixer constructed in accordance with this invention and showing the mixer prior to starting of the engine with which it is associated, Fig. 2 is a fragmentary view of the upper portion of the mixer and showing the latter in a position typical of idle and idle progression operation of the engine, Fig. 3 is a view similar to Fig. 2 and showing the upper portion of the mixer in a position typical of loading or full loading conditions of the engine, Fig. 4 is a horizontal, cross-sectional view taken upon the line 4—4 of Fig. 1 showing the starting air control valve and open position, Fig. 5 is a fragmentary, vertical, sectional view showing the connection of the air equalization line into the mixer, the view being taken on line 5—5 of Fig. 4, Fig. 6 is a horizontal, cross-sectional view taken upon the line 6—6 of Fig. 1, and Fig. 7 is a fragmentary, vertical, sectional view of the upper portion of the mixer illustrating a modification of the diaphragm fluid flow control means.

In the drawings, the numeral 10 designates the intake stack of an internal combustion engine, the stack having therein the usual throttle valve 11 adapted for actuation by an operating arm 12. The lower portion 13 of a fuel gas mixer housing is received on the upper or inlet end of the stack 10, the portion 13 including an annular, outwardly extending disk-like flange 14 adjoining a central depending collar 15 the lower end of which connects to the upper end of the stack 10. The collar 15 is formed with a vertical, axial bore 16 of approximately the same diameter as the bore 17 of the stack 10, the upper portion of the bore 16 flaring outwardly as shown at 18. A sealing gasket 19 is provided between the lower end of the collar 13 and the upper end of the intake stack 10.

An intermediate portion 20 of the mixer housing is supported upon the flange 14 of the lower portion 13 of the housing, the intermediate portion 20 being secured to the flange 14 by bolts 20', and being sealed with respect to the flange 14 by a suitably contoured sealing gasket 21. The intermediate portion 20 includes an outer, hollow, annular intake ring 22 having an open bottom overlying the flange 14 and forming a fuel gas inlet passage or conductor 23 completely encircling the marginal portion of the mixer housing. The flange 14 is formed with a boss 24 extending downwardly and outwardly from the underside of the flange and provided with a screw-threaded passage 25 receiving a fuel gas inlet conductor 26. A regulating valve 27 connects the conductor 26 to a fuel gas supply conductor 28, and a passage 29 opens upwardly from the passage 25 through the gasket 21 and into the interior 23 of the ring 22. Thus, fuel gas is conveyed from the supply conductor 28 through the valve 27 and passes into the interior of ring 22.

A plurality of radial webs 30 extend inwardly from the ring 22 to a central Venturi 31 having its lower or outlet end extending downwardly or depending into the divergent portion 18 of the bore 16, the upper portion of the Venturi projecting upwardly above the ring 22 and having a planar upper edge or face 32. The webs 30 are hollow, as shown at 33 in Fig. 5 and communicate between the interior 23 of the ring 22 and an annular fuel gas passageway 34 formed interiorly of the Venturi 31. A circular slot 35 extends radially inwardly from the passageway 34, opening into the throat of the Venturi 31 at its point of minimum cross-sectional area for flow of fuel gas into the interior of the Venturi throughout its complete internal periphery.

Auxiliary air passages 36 extend between the webs 30, opening downwardly exteriorly of the Venturi into the divergent portion 18 of the bore 16, and opening upwardly between the outer periphery of the Venturi and the inner periphery of the ring 22. An annular choke plate 37 overlies the open upper ends of the passages 36 and is provided with a plurality of ports 38 adapted to be shifted into alignment with the passages 36 when the choke plate 37 is shifted or revolved around the upper end of the Venturi 31. A suitable flexible actuating wire or rod 39 extends through a flexible housing 40 which is clamped to the intermediate portion 20 of the mixer housing at 41, the wire 39 being joined to an actuating arm 42 which extends radially outwardly from the plate 37 as shown in Fig. 4. An arcuate slot 43 in the plate 37 receives a headed bolt or pin 44 extending upwardly from the intermediate portion 20 and carrying a compression spring 45 for constantly urging the plate 37 downwardly against the inlets to the passages 36 while permitting the plate to undergo limited rotational movement in accordance with actuation by the wire 39.

Normally, the plate 37 remains in a position closing the passages 36 but may be shifted as desired for opening the auxiliary air passages in accordance with operating requirements of the engine to which the fuel mixer is attached.

Outwardly of the plate 37, the intermediate portion 20 of the mixer housing is formed with a plurality of spaced upstanding posts 46 carrying at their upper ends an integral, annular ring 47 which is spaced above the ring 22 so as to provide an air inlet space opening radially inwardly between each pair of the posts 46.

A circular diaphragm 48 has its margin overlying the ring 47 and clamped thereto by the marginal portion of an upwardly dished cover plate 49 having securing bolts 50 extending downwardly through the margin of the diaphragm 48 into the posts 46 and the ring 47. The cover plate 49 thus encloses with the diaphragm a diaphragm housing or chamber 51 positioned above the diaphragm and between the diaphragm and the cover plate.

The diaphragm 48 is formed with a central aperture 52 from which a diaphragm-weighting and flow-controlling element 53 depends into the throat of the Venturi 31. The upper face of the element 53 is clamped to the inner margin of the diaphragm 48 about the aperture 52 by means of a circular ring 54 adjoining the upper surface of the diaphragm and holding the margin of the aperture 52 clamped to the upper side of the element 53 by suitable fastening members 55. Thus, the element 53 is securely clamped and attached to the diaphragm 48 so as to constitute a diaphragm assembly or unit completely enclosing in pressure-tight relationship the interior of the chamber 51.

The element 53 is hollow and has the general form of an inverted cone with inwardly curved or concave sidewalls extending to the downwardly facing open lower end 56 of the element 53. It is to be noted that the open lower end 56 of the element 53 is disposed well below the plane of minimum cross-sectional area of the Venturi 31 when the diaphragm unit is in its lowermost position, as shown in Fig. 1, and that when the diaphragm unit is in its uppermost position, as shown in Fig. 3, the open lower end 56 of the element 53 is generally in the plane of the circumferential slot 35 of the Venturi. The upper portion of the element 53 is of sufficient diameter as to seat upon the face 32 at the upper end of the Venturi 31 so as to close off the Venturi when the diaphragm unit is in its lowermost position, and as the diaphragm unit moves upwardly, an increasingly larger annular space is provided or opened between the diaphragm unit and the upper end or edge of the Venturi.

For controlling fluid flow through the opening 56, a central core 57 depends from the center of the cover plate 49 axially of the element 53 and projects slightly below the lower end of the element 53 when the diaphragm unit is in its lowermost position. The upper portion of the core 57 is formed with external screw-threads and has its upper end received in a screw-threaded opening 58 provided in the bottom of a recess or downwardly offset section 59 formed in the center of the cover plate 49. A lock nut 60 resides in the recess 59 and engages in screw-threaded relationship the upper end of the core 57 for locking the core in a selected vertical position while yet permitting limited vertical adjustment of the core 57 with respect to the Venturi 31.

The lower portion of the core 57 is generally cylindrical in shape and merges into a flaring or conical section 61 at the lowermost end of the core 57, the lower extremity of the section 61 being of a diameter only slightly less than the internal diameter of the opening 56 so that when the diaphragm unit is in its lowermost position only a very restricted opening or flow space 62 is provided between the core and the element 53. There is, however, no complete closing off of this flow space, and obviously, as the diaphragm unit moves upwardly, the flow space is increased in area by reason of the presence of the tapered or conical section 61.

An annular air cleaner or filter ring 63 is enclosed in a suitable housing or frame 64 which rests upon the outer portion of the flange 14 surrounding the mixer housing, the upper portion of the housing 64 being formed of a circular disk 65 from which a securing bolt 66 extends downwardly through the tubular core 57 to a spider 67 formed in the upper portion of the intake stack 10. Thus, the bolt 66 clamps the air cleaner structure to the mixer housing and in turn clamps the entire mixer assembly to the upper end of the intake stack 10.

For providing controlled communication between the lower portion or outlet end of the intake stack 10, a suitable conductor 68 indicated by a dotted line in Fig. 1, extends from a small port 69 opening into the intake stack below the throttle valve 11, to an idling control valve 70 opening upwardly through the flange 14 of the lower section 13 of the mixer housing. The intermediate portion 20 of the mixer housing includes an upright tubular post 71 into which the valve 70 opens, the upper end of the bore of the post 71 communicating with the interior of the chamber 51 through a radial passage 72 formed in the cover plate 49. An orifice insert sleeve 73 is provided at the juncture between the bore of the post 71 and the passage 72 both for aligning purposes as well as flow restricting purposes. Further, the flange 14 is provided with a depending boss 74 having a passage 75 opening upwardly through the gasket 21 into the space between the air cleaner and the mixer housing and being adapted for reception of a tube or conductor 76 leading to the conventional pressure regulator unit (not shown) employed in systems of this type for control of the inlet pressure of the fuel gas. The conductor 76 functions as an atmospheric pressure balancing means in the usual and well known manner.

The lower end of the element 53 and the cone 57 may take various forms for flow-regulating purposes. Thus, as shown in Figure 7, the lower end of the element 53 may be swaged or turned inwardly, as indicated at 77, and the modified cone 78 may be substantially cylindrical throughout its length and carry longitudinal grooves 79 extending upwardly from a point slightly above the lower end of the cone. In this manner, provision is made for increasing the flow space at the lower end of the element 53 as the diaphragm unit moves upwardly with respect to the Venturi and the cone.

Before discussing the operation of the fuel mixer of this invention, it is to be noted that fuel systems of this general type for internal combustion engines utilizing liquefied petroleum gas normally include a fuel supply tank or vessel containing liquefied petroleum gas under relatively high pressure and from which the fuel is supplied through a fuel conductor to a first or high pressure regulator which functions to reduce the pressure under which the fuel is supplied, the reduced pressure fuel flowing to a vaporizer to which heat is supplied and wherein the liquid fuel is fully vaporized, after which the fuel flows to a low pressure regulator from which it is supplied at a pressure slightly below atmospheric to the fuel mixing structure or unit. Thus, the conductor 28 in the present structure will have supplied thereto fuel gas in a completely vaporized form and at a pressure slightly below atmospheric, for example under a vacuum of 0.15 inch of water. With the engine at rest, the weight of the element 53 will function to move the diaphragm unit downwardly so that the outer margin of the element 53 contacts the upper edge or face 32 of the Venturi 31 to close off the Venturi and the intake stack, it further being noted that the plate 37 will be in such position that the ports 38 are not in registry with the auxiliary air passages 36, and thus the intake stack and intake manifold of the engine will be completely closed off. Under these conditions, the intake stack and intake manifold will remain filled with a combustible air and fuel mixture present therein as a result of the previous operation of the engine, and such mixture will remain in place, available for instant demand, over a period of several hours or even several days.

Now, as starting operations for the engine are commenced and the engine is cranked over, a low pressure will immediately be communicated to the lower or outlet end of the intake stack. As pointed out above, when the engine is cranked for starting purposes, the diaphragm unit is in engagement with the upper edge 32 of the Venturi and hence is closing off the Venturi as well as the inlet end of the intake stack. Accordingly, as cranking of the engine is initiated, a vacuum is applied both above and below the throttle valve 11, is applied to the underside of the element 53, and is applied through the passage 62 as well as through the conductor 68 to the chamber 51. The portion of the diaphragm 48 exterior of the Venturi 31, however, has its underside exposed to atmospheric pressure, and accordingly, a pressure differential across the diaphragm unit is created due to the differential areas exposed to manifold and to atmospheric pressure. Thus, atmospheric pressure is tending to lift the diaphragm unit, while the weight of the element 53 is tending to hold the diaphragm unit in its lowermost position. Of course, the vertical adjustment of the core 57, along with the adjustment of the valve 70, will have a degree of control over the creation of this differential pressure, but the relative weight of the element 53 and the area of the passage 62 will, by design, also affect this initial operation.

As stated hereinbefore, fuel gas is supplied to the passageway 34 and the slot 35 under a slight vacuum, as, for instance, 0.15 inch of water, and accordingly, the various parts of the structure may desirably be constructed and arranged to cause the diaphragm unit to commence its lifting action at a slightly lower vacuum, as, for instance 0.20 inch of water. This opening pressure differential, which will be the differential between the interior of the Venturi and atmospheric pressure may be varied to some degree by vertical adjustment of the core 57.

As cranking of the engine continues, fuel gas, being at a higher pressure within the slot 35 than the absolute pressure existent within the interior of the Venturi, will flow inwardly into the Venturi, and at the same time, the slight lifting of the element 53 from the upper end of the Venturi will open an air flow space through which air also flows into the Venturi for mixing with the fuel gas and supplying of a combustible starting mixture to the engine cylinders. Of course, the relative flow areas of the passage 62 and the Venturi 31, as well as the weighting or mass of the element 53 are design matters which must be adjusted to engines of varying requirements in accordance with well known and established principles, but to a large degree, the present gas mixer has been found to have a quite wide latitude of operability insofar as engines of varying fuel requirements are concerned.

Also as stated above, the critical combustion range or gas and air ratio necessary for utilizing liquefied petroleum gas as fuel in internal combustion engines is somewhat more critical than that observed when gasoline is being employed as a fuel. The present mixer is normally adjusted so as to provide a slightly rich starting mixture. This will compensate for the loss of some gas-air mixture while the engine is at rest, and in the event the engine does not start immediately, the operator may pull out the choke knob which is attached to the rod 39 so as to shift the plate 37 and open the auxiliary air passages 36. Although this by-passes the Venturi 31 with the air flow rather than decreasing air flow as is the usual practice on gasoline carburetors, it retains a fixed and established pattern of operation for the person starting the engine and has the same beneficial result of aiding in effecting initial combustion. The supplying of additional quantities of air will cause the fuel mixture to lean progressively, or become less rich, as cranking is continued, and if the engine still fails to start, the choke button is again pushed in, in the usual manner, which shuts off the auxiliary air passages and causes the fuel mixture to commence a progressive enriching as cranking continues. Thus, the operator, is enabled to vary the fuel mixture from richness to leaness and again to richness, even though he carries out this operation unknowingly, and is ensured of passing one or more times through the critical ignition mixture range, resulting in the supplying to the engine of a fuel mixture of the proper richness for starting. With butane the range is 1.9 to 9% butane in the air-butane mixture.

Once the engine starts and begins to idle, the pressure in the intake manifold of the engine will normally be in the range of 20 to 21 inches of mercury measured as vacuum or as below atmospheric pressure, and at this point, the idling control line 68, coupled with the element 53, takes on an increasingly important function. The vacuum in the interior of the Venturi has to be at least slightly below the vacuum at which fuel gas is being applied in order to ensure the continued flow of fuel gas, and such vacuum is ensured by continued withdrawal of fluid from the interior of the Venturi through the passage 62 and into the chamber 51 from which the fluid, whether it be air, fuel gas, or a mixture thereof, is withdrawn through the line 68 to the outlet end of the intake stack which, as pointed out above, is under a considerable vacuum. The lowered pressure within the chamber 51, which tends to lift the diaphragm unit is, however, countered to a considerable degree by the mass of the element 53 which tends to lower the diaphragm unit and prevents the element 53 from withdrawing completely to its uppermost position. Thus, by adjustment of the valve 70, the lifting of the diaphragm unit may be regulated and controlled to a point proper for supplying sufficient air and fuel gas through the Venturi and for maintaining the proper richness for this fuel mixture to operate the engine correctly under idling conditions. At this point, it is to be pointed out that if the gas and air valves were physically tied together as is the case in a variable orifice type gas mixer, and the mixer were adjusted to provide a fuel mixture sufficiently rich for starting the engine, the mixture would be far too rich for idling conditions.

Now, as the loading on the engine is increased and it starts through the zone generally known as idle progression, the vacuum in the intake manifold of the engine is necessarily decreasing, or stated in other words, the absolute pressure in the manifold is increasing due to the gradually increasing opening of the throttle valve 11. Such opening of the throttle valve increases the vacuum in the outlet of the mixer housing and in the interior of the Venturi, thus decreasing the pressure above and below the element 53, allowing the diaphragm unit to rise an additional amount and permitting the flow of additional quantities of air through the Venturi. The divergent portion 61 of the core 57 continues to function at this point to increase the cross-sectional area of the flow space 62 so that the lower pressure is more readily and quickly communicated to the interior of the chamber 51 while gas continues to be withdrawn from the chamber 51 through the conductor 68. Under idling conditions the vacuum in the engine intake manifold will be 20 to 21 inches of mercury, and of course, this vacuum decreases as the throttle 11 is opened. The rate of gas withdrawal from the chamber 51 through the conductor 68 remains relatively unchanged, however, due to the presence of the flow restricting valve 70 until the vacuum in the intake manifold drops to about 16 inches of mercury. Thereafter the communicating of the sub-atmospheric pressure to the chamber 51 is largely controlled through the passage 62.

Up to this point, the mixer has been functioning generally as a variable orifice type mixer although the air and gas valves are not tied together, but primarily for the reason that the diaphragm unit is moving gradually away from the upper end of the Venturi so as to increase the air inlet opening. Thus, the unit is reaping the advantages inherent in a variable orifice type mixer and at the same time employing to some extent variable pressure differential operation for fuel gas supply. As, however, the engine is increasingly loaded through the idle progression range, the mixer, while continuing to employ simultaneously both variable orifice and variable pressure differential operation, is shifting gradually but positively toward variable differential operation which has, of course, certain inherent advantages and characteristics for utilization with an engine operating from partial to full load. At this stage, the opening of the throttle valve causes the pressure in the inlet end of the intake stack as well as within the Venturi to be gradually reduced as the low pressure zone of the intake manifold is more fully exposed to the Venturi and intake stack inlet, this reduced pressure being communicated through the passage 62 into the chamber 51 so that the diaphragm unit continues to lift to admit additional quantities of air and afford greater velocity of air flow through the Venturi. At the same time, however, the lifting of the element 53 with respect to the core 57 withdraws the tapered portion 61 from the opening 56, or in the form shown in Fig. 7, exposes increasingly larger portions of the grooves 79 so that air or gas flow through the opening 56 or passage 62 into the chamber 51 is facilitated and the mass or weight of the element 53 is accorded an increasing effect.

Stating this operation in a different manner, it is pointed out that when the engine is idling, the intake manifold vacuum will be about 20 to 21 inches of mercury, and this vacuum dominates the fluid flow into the chamber 51. Under these conditions, a given adjustment or opening of idling valve 70 will result in a given application of vacuum to the upper surface of the diaphragm 48, or a given lifting force being applied to the element of cone 53. There is also an evacuation of chamber 51 through the passage 62, and when the element 53 is in the position shown in Fig. 1, more of the weight of the element 53 is sustained by the vacuum in the chamber 51. The gradual lifting of the element 53 is sustained by the vacuum in the chamber 51. The gradual lifting of the element 53 allows more fluid flow into the chamber 51, and since the volume of fluid flow through the valve 70 is substantially constant from a vacuum of 21 inches of mercury, or slow idling of the engine, to 16 inches of mercury, or the terminal portion of the idle progression section of engine operation, the net result will be the decrease in the lifting force applied to the element 53, providing more choking of the air flow, creating enhanced vacuum conditions in the Venturi and drawing more gas through the Venturi and into the engine. Thus, an adequate flow of gas is ensured through the idling and idle progression periods even though the volume of air flow through the Venturi is not sufficient to create such fuel gas flow due to Venturi action.

As the element 53 rises with respect to the core 57, the area of the annular opening 62 will increase, and this area determines the suction or force pending to draw gas into the Venturi and into the engine. The action continues with the element 53 throttling the air flow in accordance with engine demand until the air flow through the Venturi has reached such volume and velocity as to, in turn, become effective for evacuation of the chamber 51 through the annulus 62 and movement of the diaphragm unit to the position shown in Fig. 3.

Thus, the increasing flow of air which is passing through the Venturi, gradually exerts more lift to the upper side of the diaphragm, acting as it does in chamber 51, until this air flow alone is capable of sustaining the weight of the element 53, at which point, the element 53 is lifted out of the way, and the unit moves smoothly into straight Venturi operation. In this manner, the condition illustrated in Fig. 3 is achieved in which the diaphragm unit has moved to its uppermost position, partial evacuation of the chamber 51 being maintained partially through the conductor 68 but primarily through the open lower end 56 of the element 53 which, at this point, is in the plane of minimum cross-sectional area of the Venturi and consequently the plane of the Venturi reflecting the lowest pressure. From this point on, the unit functions as an ordinary variable differential gas mixer having fixed orifices and depending upon varying air flow for creation of varying pressures within the Venturi and ensuring proper and adequate flow of fuel gas for achieving the correct air fuel mixture.

Of course, as the engine loading varies from full downwardly through idle progression and to idling condition and upwardly again, or in accordance with whatever operating conditions may be present in either a varying or steady manner, the unit will shift back and forth in the manner described to ensure full control and proper fuel mixture richness at all levels. When the engine is stopped, the weight of the element 53 causes the diaphragm unit to return to its lowermost position, thus closing off the Venturi and the intake stack so that the latter remain full of a fuel mixture of very nearly proper starting richness. Therefore, on subsequent starting operations within a period of a few hours or even over considerably longer periods of time, almost instantaneous starting of the engine is ensured.

It is quite well known that the Venturi of a fuel mixer for internal combustion engines should desirably have sufficient flow capacity to handle adequately the air demanded at full loading conditions of the engine as otherwise the engine is partially starved of air and cannot achieve maximum power. At the same time, however, a Venturi of sufficiently large flow capacity operates very poorly at low speeds due to the low rate of air flow therethrough, and insufficient control of fuel gas flow is obtained. It is for this reason that multiple fuel mixers or carburetors, or the so-called "multiple barrel" carburetors are in such widespread use. The present invention, however, completely solves this problem, achieving effective operation at idling and very low speeds and yet providing a Venturi of sufficient capacity for full power operation of the engine.

It is pointed out hereinbefore that the choke plate 37 may be employed in the starting operation, but there are also instances in which it is desirable to operate an engine selectively either upon liquefied petroleum gas as a fuel or upon gasoline as a fuel. In such cases, a suitable gas carburetor may be mounted below the gas mixer of this invention, and when it is desired to utilize gasoline as an engine fuel, the choke plate 37 is merely shifted to open the auxiliary air inlet passages, leaving the Venturi 31 closed and more or less placing the present gas mixer out of operation. Of course, the use of the gasoline mixer or carburetor is entirely optional and is generally controlled by suitable means for physically admitting or shutting off the supply of gasoline to the gasoline carburetor.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A fuel mixer for internal combustion engines having an air intake stack with a throttle valve therein, the mixer including, a mixer housing, a Venturi in the housing having an inlet and an outlet and a throat therebetween, a gaseous fuel inlet to the throat of the Venturi, a diaphragm unit constructed and arranged to close the inlet of the Venturi, the outlet of the Venturi communicating with the air intake stack, means for urging the diaphragm unit toward the inlet of the Venturi to close the same, the inlet of the Venturi and that side of the diaphragm unit facing the Venturi being exposed to atmosphere, means forming a chamber with the opposite side of the diaphragm unit, means for placing the chamber in communication with the air intake stack on the side of the throttle valve opposite the side thereof exposed to the Venturi outlet, and means for exposing the chamber to the interior of the Venturi.

2. A fuel mixer for internal combustion engines having an intake stack with fuel mixture inlet and outlet and a throttle valve therebetween, the mixer including a mixer housing having an air inlet and a fuel mixture outlet adapted to be connected to the intake stack inlet, a Venturi in the housing having an inlet exposed to the housing inlet and an outlet exposed to the housing outlet with a throat between the Venturi inlet and outlet, a gaseous fuel inlet to the throat of the Venturi, a diaphragm unit movable in the housing with respect to the Venturi and having one side exposed to the housing inlet and arranged to close the Venturi inlet, means enclosing the opposite side of the diaphragm unit to form a chamber, means for urging the diaphragm unit toward the Venturi inlet to close the same, means for exposing the chamber to the fuel mixture outlet of the intake stack, and means for exposing the chamber to the interior of the Venturi.

3. A fuel mixer as set forth in claim 2, and means for increasing the exposure of the chamber to the interior of the Venturi as the diaphragm unit moves away from the Venturi inlet.

4. A fuel mixer as set forth in claim 2, and fixed orifice means in the means for exposing the chamber to the fuel mixture outlet of the intake stack.

5. A fuel mixer as set forth in claim 2, and auxiliary air passages between the housing inlet and the housing outlet by-passing the Venturi, and means for closing the auxiliary air passages.

6. A fuel mixer as set forth in claim 2 wherein the means for exposing the chamber to the interior of the Venturi exposes the chamber to the plane of the Venturi throat of minimum cross-sectional area when the diaphragm unit is in its position furthermost from the Venturi inlet.

7. A fuel mixer as set forth in claim 2, wherein the diaphragm unit includes a flow-directing element of generally inverted conical shape having inwardly curved walls and extending into the Venturi from the inlet side thereof, the flow-directing element forming a part of the means for exposing the chamber to the interior of the Venturi.

8. A fuel mixer as set forth in claim 2, wherein the diaphragm unit includes a flow-directing element of generally inverted conical shape and extending into the Venturi from the inlet side thereof, the flow-directing element terminating within the Venturi in a flow passage, and a cone extending from the chamber through the flow passage of the flow-directing element, the diaphragm unit being movable over the cone, and the cone being of nonuniform cross-sectional area lengthwise, the cone and flow passage forming at least a portion of the means for exposing the chamber to the interior of the Venturi.

9. A fuel mixer for internal combustion engines having an intake stack with fuel mixture inlet and outlet and a throttle valve therebetween, the mixer including a mixer housing having an air inlet and a fuel mixture outlet adapted to be connected to the intake stack inlet, a Venturi in the housing having an upwardly facing inlet exposed to the housing inlet and an outlet exposed to the housing outlet with a throat between the Venturi inlet and outlet, a gaseous fuel inlet to the throat of the Venturi, a diaphragm unit disposed in the housing over the inlet of the Venturi and being movable toward the Venturi inlet for closing the same, the side of the diaphragm unit facing the Venturi being exposed to the housing inlet, means enclosing the opposite side of the diaphragm unit to form a chamber, means for exposing the chamber to the intake stack outlet, means for exposing the chamber to the housing outlet, and weighted means forming a part of the diaphragm unit for biasing the diaphragm unit toward the Venturi inlet.

10. A fuel mixer as set forth in claim 9, and means for increasing the exposure of the chamber to the housing outlet as the diaphragm unit moves away from the Venturi inlet.

11. A fuel mixer as set forth in claim 9, and fixed orifice means in the means for exposing the chamber to the intake stack outlet.

12. A fuel mixer as set forth in claim 9, and auxiliary air passages between the housing inlet and the housing outlet by-passing the Venturi, and means for closing the auxiliary air passages.

13. A fuel mixer as set forth in claim 9, wherein the weighted means is an inverted truncated cone with concave side walls depending from the diaphragm unit into the Venturi and having an internal bore forming the means for exposing the chamber to the housing outlet.

14. A fuel mixer as set forth in claim 9, wherein the weighted means is an inverted truncated cone with concave side walls depending from the diaphragm unit into the Venturi and having an internal bore forming the means for exposing the chamber to the housing outlet, and a core depending into the Venturi through the bore of the cone, the core being of upwardly-decreasing cross-sectional area.

References Cited in the file of this patent

UNITED STATES PATENTS

| | | |
|---|---|---|
| 1,013,214 | Noyes | Jan. 2, 1912 |
| 2,233,523 | Forgar | Mar. 4, 1941 |
| 2,927,848 | Baverstock | Mar. 8, 1960 |
| 2,943,849 | Csecs | July 5, 1960 |